US008560289B2

(12) United States Patent
Fevrier et al.

(10) Patent No.: US 8,560,289 B2
(45) Date of Patent: Oct. 15, 2013

(54) METHOD FOR THE SIMULATION OF THE PHYSICAL BEHAVIOR OF A TIRE ROLLING ON THE GROUND

(75) Inventors: Pierre Fevrier, Clermont-Ferrand (FR); Hervé Martin, Zurich (CH)

(73) Assignee: Michelin Recherche et Technique S.A., Granges-Paccot (CH)

( * ) Notice: Subject to any disclaimer, the term of this patent is extended or adjusted under 35 U.S.C. 154(b) by 392 days.

(21) Appl. No.: 12/439,683

(22) PCT Filed: Jul. 26, 2007

(86) PCT No.: PCT/FR2007/001294
§ 371 (c)(1),
(2), (4) Date: Aug. 14, 2009

(87) PCT Pub. No.: WO2008/025891
PCT Pub. Date: Mar. 6, 2008

(65) Prior Publication Data
US 2009/0292515 A1    Nov. 26, 2009

(30) Foreign Application Priority Data
Sep. 1, 2006    (FR) .................................... 06 07705

(51) Int. Cl.
*G06G 7/48*    (2006.01)
(52) U.S. Cl.
USPC ... 703/8; 703/2; 703/6; 152/532; 152/209.06; 152/510; 701/1; 701/54; 702/42; 702/142; 702/183; 73/146; 73/116.06; 73/116.08
(58) Field of Classification Search
USPC ................. 702/42, 34; 703/2, 6, 8; 73/146, 8; 701/1, 71
See application file for complete search history.

(56) References Cited

U.S. PATENT DOCUMENTS

| 8,020,597 B2 * | 9/2011 | Ellwood et al. ............... 152/510 |
| 2006/0136151 A1 * | 6/2006 | Shiraishi .......................... 702/42 |

FOREIGN PATENT DOCUMENTS

EP    1 516 751    3/2005

OTHER PUBLICATIONS

K. K Hofstetter, Ch. Grohs, J. Eberhardsteiner, H. A. Mang Sliding behavior of simplified tire tread patterns investigated by means of FEM Computers & Structures 84, pp. 1151-1163, 2006.*
Naoshi Miyashita, Kazuyuki Kabe EP 1516751 A2 Mar. 23, 2005.*
Ebbott et al. Tire Temperature and Rolling Resistance Prediction with Finite Element Analysis Tire Science and Technology, TSTCA vol. 27, N. 1, Jan.-Mar. 1999, pp. 2-21.*
A. R. Plummer Model-in-the-loop testing JSCE207, IMechE 2006.*

(Continued)

*Primary Examiner* — Omar Fernandez Rivas
*Assistant Examiner* — Cuong Luu
(74) *Attorney, Agent, or Firm* — Cozen O'Connor

(57) ABSTRACT

A method for simulating the behavior of a tire mounted on a vehicle in running conditions on the ground, wherein a mechanical model is provided for essentially computing the longitudinal (Fx) and transverse (Fy) stresses transmitted by the tire between the ground and the vehicle in accordance with dynamic parameters related to the physical conditions of the tire running and use and in accordance with physical tire-specific parameters. The mechanical model is set and solved in an iterative manner, under the assumption that the tire in contact with the surface of the ground has an adherence contact area and a sliding contact area and under the assumption that there is a unique x-coordinate point b that is indicative of the transition between the two contact areas.

8 Claims, 10 Drawing Sheets

(56) References Cited

OTHER PUBLICATIONS

Li et al. Simulation of Vehicle Stability Control System Using Fuzzy PI Control Method 0-7803-9435-6 IEEE 2005.*

Hofstetter et al. Sliding behavior of simplified tire tread patterns investigated by means of FEM Computers & Structures 84, pp. 1151-1163, 2006.*

Lim et al. Lateral and Longitudinal Vehicle Control Coupling for Automated Vehicle Operation Proceedings of the American Control Conference, Jun. 1999.*

T.G. Ebbott et al., "Tire temperature and rolling resistance prediction with finite element analysis", Tire Science and Technology, vol. 27, No. 1, pp. 2-21, Jan. 1999.

A.R. Plummer, "Model-in-the-loop testing", Proceedings of the Institution of Mechanical Engineers, Part I, vol. 220, pp. 183-199, May 2006.

S. Futamura et al., "Simplifying the Thermal Analysis of a Rolling Tire with Deformation Index Method", 2004 Technical Meeting of the American Chemical Society, Rubber Division, pp. 1-27, May 17, 2004.

C-R Lee et al., "Validation of a FEA Tire Model for Vehicle Dynamic Analysis and Full Vehicle Real Time Proving Ground Simulation", SAE Paper No. 971100, pp. 1-8, 1997.

Teodorescu et al., "Influence Factors on Truck Tyre Rolling Resistance", Polytechnical University of Bucharest, Scientific Bulletin, Series D: Mechanical Engineering, vol. 62, No. 2, pp. 65-73, 2000.

\* cited by examiner

Figure 1
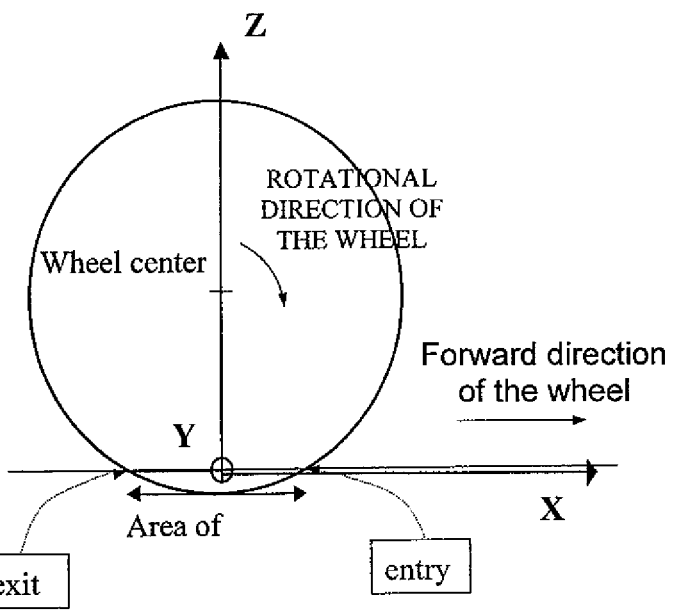
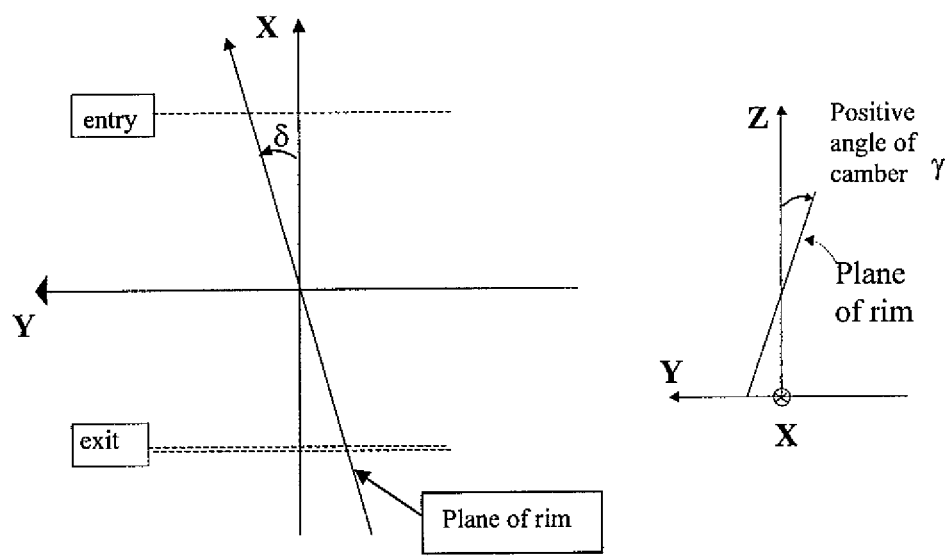
Figure 2                    Figure 3

METHOD FOR THE SIMULATION OF THE PHYSICAL BEHAVIOR OF A TIRE ROLLING ON THE GROUND

RELATED APPLICATIONS

This is a U.S. National Phase Application under 35 USC §371 of International Application PCT/FR2007/001294, filed on Jul. 26, 2007

This application claims the priority of French patent application nos. 06/07705 filed Sep. 1, 2006, the subject matter of which is hereby incorporated by reference.

FIELD OF THE INVENTION

This invention relates, in general, to techniques related to the equipping of motor vehicles with tires.

More precisely, the invention relates to a method of simulating the physical behavior of a tire equipping a vehicle rolling on the ground, wherein the tread of the tire has a contact area which includes an adherent contact area and a sliding contact area, this method comprising at least the operations consisting of calculating longitudinal forces and lateral forces transmitted by the tire, between the ground and the vehicle, based on dynamic parameters related to physical rolling and operating conditions of the tire and based on specific physical parameters of the tire.

Several examples of tire simulation methods are known by persons skilled in the art, and examples thereof are provided in the patent documents EP 1 371534, EP1516751 and US2001/0020386.

BACKGROUND OF THE INVENTION

The most well-known method, which was developed by M. Pacejka in 1996 and disseminated under the name "Magic Formula," models the tire by means of parameters devoid of any causal link with the physical, and thus proves to be unsuitable for faithfully accounting for the forces transmitted by a tire, a fortiori, under circumstances of significant and/or variable stresses.

Although some of the more recent simulation methods, and particularly those described in the above-mentioned patent documents, use a relatively complete physical model of the tire, these methods do not make it possible to provide real-time usable values for the longitudinal forces, lateral forces and self-aligning torque of the tire.

SUMMARY OF THE INVENTION

One object of the invention is to overcome the limitations of the existing methods, such as those described above.

To that end, one aspect of the invention is directed to a method that includes the steps of:
establishing, over the course of a preliminary phase, by applying physical laws which are known and/or established by specific experiments, and as a first model, a model of the longitudinal forces, the lateral forces, a self-aligning torque related to the intensity of these forces and to the distribution of same within the contact area, and of an equilibrium of the basic shear and sliding forces of the tire at a presumed unique point of passage between the adherent and sliding contact regions, this first model taking the form of a system of respective equations expressed in relation to the dynamic parameters, the specific parameters, and the abscissa of the point of passage;
assigning values to the dynamic parameters and to the specific parameters, with a view to a digital application; and
solving, by successive approximations, over the course of a digital application iterative phase consisting of a succession of computation cycles, and at least from previously known or estimated values of the abscissa of the point of passage, of the lateral forces, and of the self-aligning torque, of new values for the abscissa of the point of passage, of the lateral forces, and of the self-aligning torque, which solve the system of equations of the first model for the values assigned to the dynamic parameters and to the specific parameters, the result of which is that the longitudinal forces, the lateral forces and the self-aligning torque can be computed in real time as the vehicle is traveling.

This method preferably further includes an operation implemented after the end of the iterative phase and consisting in updating at least the dynamic parameters, in order to take account of the changes undergone by these parameters during execution of the iterative phase, and to initiate a new iterative phase.

Each new computing cycle for each iterative phase includes, for example, the operations at least consisting in:
computing a new temporary value for the abscissa of the point of passage from the equilibrium of basic forces equations and from the previously known or estimated values for the lateral forces and the self-aligning torque;
computing, from the new temporary value of the abscissa of the point of passage and from the equations linking the lateral forces and the self-aligning torque to the dynamic parameters, to the specific parameters, and to the abscissa of the point of passage, new values for the lateral forces and the self-aligning torque, which can be used for a possible subsequent computing cycle;
conditionally interrupting said iterative phase, at least when the deviation between the new temporary value of the abscissa of the point of passage and the previously known or estimated value of this abscissa is lower than the predetermined accuracy limit;
upon interruption of said iterative phase, and as values for this phase, assigning, to the lateral forces and self-aligning torque, the new values for the lateral forces and the self-aligning torque, which were obtained during the last computing cycle.

In its most advanced form, the simulation method according to an embodiment of the invention further includes the steps of:
taking account, in the first model established over the course of the preliminary phase, of the influence of temperature on the values of at least some of the specific parameters;
establishing, over the course of this preliminary phase, by applying physical laws which are known and/or established by specific experiments, and as a second model, a local temperature rise model expressing variations in a contact temperature of the tire tread with the ground from the beginning to the end of the contact area, via contact of the tire tread with the ground and sliding;
establishing, over the course of this preliminary phase, by applying physical laws which are known and/or established by specific experiments, and as a third model, a global temperature rise and thermal flux model, this third model taking the form of a system of equations expressing variations in a peripheral tire tread temperature and an internal tire temperature, over one wheel revolution period, in relation to previously known or estimated values of the peripheral and internal temperatures, the thermal conductivity of the tire tread, and thermodynamic component phenomena such as internal deformations of the tire, heat exchanges between the tire the environment thereof, and sliding of the tire tread over the ground;

accepting, as additional dynamic parameters, the ground temperature, the air temperature, and the initial tire temperature;

computing, at each computing cycle for each iterative phase, the new values for the abscissa of the point of passage, for the lateral forces and for the self-aligning torque, by using the first model enhanced by the influence of temperature; and upon interruption of each iterative phase, updating the values for the peripheral and internal temperatures, in order to take account of the changes undergone by these temperatures since the end of the preceding iterative phase.

In this case, the first model is advantageously enhanced by at least taking account of the influence of change in the contact temperature on the value of the friction coefficient of the tire rubber on the ground.

The first model can also be enhanced by taking account of the influence of the internal tire temperature on the value of the shear modulus of the rubber compound of the tire tread.

The second computing model preferably uses the peripheral tire temperature, which is obtained by applying the third model, for computing the contact temperature upon entering the contact surface.

Computation times can be further reduced by providing for each iterative phase to be preceded by a preparatory phase, over the course of which quota quantities are computed, including the dimensions of the contact area, by means of a sub-set of said equations and based on values assigned to the dynamic parameters and to the specific parameters, each quota quantity being used in said iterative phase with a value assigned thereto during the preparatory phase.

Another aspect of the invention relates to the application of the method as previously defined to the real-time simulation of the dynamic behavior of a vehicle equipped with a chassis and with several tires rolling on the ground, this application being characterized in that at least the first model is used for each tire and is associated with a single dynamic chassis model, in that, for each tire, the chassis model provides at least said first model with the values of at least some of the dynamic parameters, and in that, for each tire, the chassis model uses the values for the longitudinal forces, the lateral forces and the self-aligning torque, which were obtained by implementing at least the first model.

This application furnishes even more accurate results in the case where the set of the first, second and third models cooperates with the dynamic chassis model, as indicated previously for the first model.

BRIEF DESCRIPTION OF THE DRAWINGS

Other characteristics and advantages of the invention will become clear from the description thereof, which is provided hereinbelow for purely non-limiting and illustrative purposes, in reference to the appended drawings, in which:

FIG. 1 is a schematic elevation view of a wheel equipped with a tire to which the method of the invention is applied;

FIG. 2 is an enlarged schematic top view of the area of contact with the ground of the tire of FIG. 1;

FIG. 3 is a schematic front view of the tire of FIG. 1;

DETAILED DESCRIPTION OF THE DRAWINGS

Figure 4:
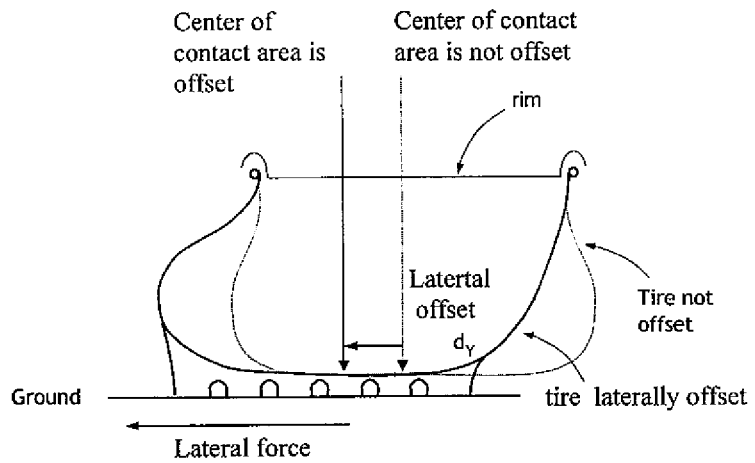
FIG. 4 is a partial schematic and radial sectional view of a tire shown in two different situations of stress.

As stated previously, an aspect of the invention relates in particular to a method of simulating the physical behavior of a tire equipping a vehicle rolling on the ground.

In a situation of a tire rolling on the ground, the tire tread has an area of contact with the ground consisting of at least one adherent contact region and at least one sliding contact region.

Based on a certain number of influence quantities, the purpose of this method is to provide the values of various forces which are transmitted by the tire between the ground and the vehicle.

In order to optimize understanding of the invention, this description will make use of the following writing conventions, a portion of which are already known to a person skilled in the art and used in existing tire models.

| | |
|---|---|
| $\delta$ | Slip angle |
| $\delta'$ | Slip angle at breaker strip level |
| $\alpha_1$ | Ply steer |
| $\gamma$ | Tilt angle (camber) |
| $\tau$ | Longitudinal slip rate |
| Fx | Longitudinal force |
| Fy | Lateral force |
| Fz | Load |
| V | Ground point velocity |
| $W_x$ | Velocity of crown points along the axis thereof |
| Mz | Self-aligning torque |
| Ny | Self-aligning torque component related to force Fy |
| Nx | Self-aligning torque component related to the widthwise distribution of forces Fx in the contact area |
| $R_L$ | Lateral stiffness of the tire |
| $R_{LL}$ | Longitudinal stiffness of the tire |
| $K_T$ | Torsional rigidity of the tire |
| $S_2$ | Bending flex on edge of dome block |
| $\mu$ | Dynamic adhesion coefficient between the tire rubber and the ground: $\mu(p, Vg, Ts)$ |
| $\mu_0$ | Static adhesion coefficient |
| Lx | Characteristic length of the contact area |
| Ly | Width of the contact area |
| ent | Tire tread grooving rate |
| AssX | Longitudinal relaxation coefficient of the tire tread |
| AssY | Lateral relaxation coefficient of the tire tread |

-continued

| | |
|---|---|
| G* | Shear modulus of the rubber compound of the tire tread |
| $e_{KM}$ | Thickness of the tire tread |
| a | Half-length of contact area |
| b | Starting sliding abscissa in contact area |
| Ti | Internal temperature profile of the rubber, between the tire surface and the breaker strips |
| Ts | Average surface temperature of the tire tread |
| Tc | Contact temperature at the interface between the rubber and the ground |
| Vg | Sliding velocity between the tire and the ground |
| $X_N, Y_N$ | Coordinates of the tire crown points (internal region of the tire tread, at the base of the tire, directly over the contact area) |
| $X_K, Y_K$ | Coordinates of the tire tread points at the level of the interface with the ground |

FIGS. 1 to 3 specify the coordinate system used as a reference.

This coordinate system is defined by:

O: the point of origin of the benchmark at the center of the contact area;

OX: the axis parallel to the velocity vector;

OY: the axis perpendicular to OX, parallel to the ground plane, regardless of the camber.

In this coordinate system, symbols convention requires that: for

τ>0, longitudinal force is generated in the direction of the axis OX; for δ>0, lateral force is generated in the direction of the axis OY, and for γ>0, a so-called negative self-aligning torque $M_2$ is generated, thereby causing a negative lateral thrust (i.e., oriented in the direction opposite to OY).

The forces transmitted by the tire, between the ground and the vehicle, include longitudinal forces Fx, lateral forces Fy, and a self-aligning torque Mz, which is related to the intensity of the longitudinal and lateral forces and to the distribution thereof within the contact area.

The influence quantities typically include, on the one hand, dynamic parameters, i.e., variable at least in relation to time, and related to the physical rolling and operating conditions of the tire, and, on the other hand, physical parameters, which are specific to the tire in question.

The dynamic parameters include the slip angle, the slip rate, the camber angle, the load, the velocity, the inflation pressure, the air and ground temperatures, the initial tire temperatures, and time.

The specific parameters include the dimensions of the contact area (length, width, form factor), the pressure profile p(x) along the contact area, the longitudinal Kx and lateral Ky rigidities of the tire tread, the structural rigidity of the tire, namely the lateral stiffness RL, the longitudinal stiffness RLL, the radial stiffness Rrr, and the torsional rigidity $K_T$, the rigidity 1/S2 of the dome block, a law of adhesion μ of the rubber/ground pair, length transfer parameters between raised surfaces of the tire ("ribs"), and are related to the dynamic parameters via relationships established by specific experiments, for which it is possible to take into account by means of the expressions provided below for illustrative purposes.

Lateral stiffness corresponds to an offset dy of the contact area (cf. FIG. 4) in relation to the plane of the wheel under the influence of a lateral force:

$$R_L = R_{L0} + R_{Lp} p$$

where $R_{L0}$ [N/m] represents the structural portion and $R_{Lp}$ the tire portion, p being the pressure expressed in bars.

Figure 5:
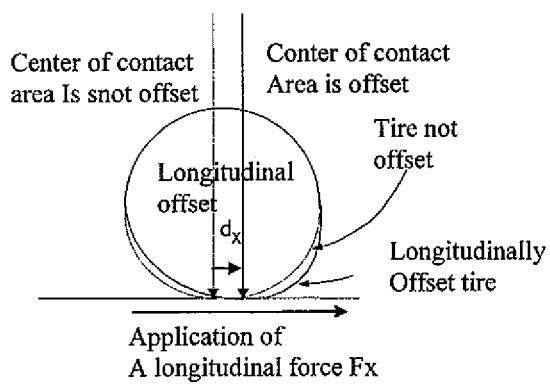
FIG. 5 is a schematic elevation view of a tire shown in two different situations of stress.

Longitudinal stiffness corresponds to an offset dx of the contact area (cf. FIG. 5) along the longitudinal axis of the wheel, in the presence of a longitudinal force Fx.

$$R_{LL} = R_{LL0} + R_{LLp} p$$

where $R_{LL0}$ [N/m] represents the structural portion and $R_{LLp}$ [N/m/bar] the tire portion, p being the pressure expressed in bars.

Figure 6:
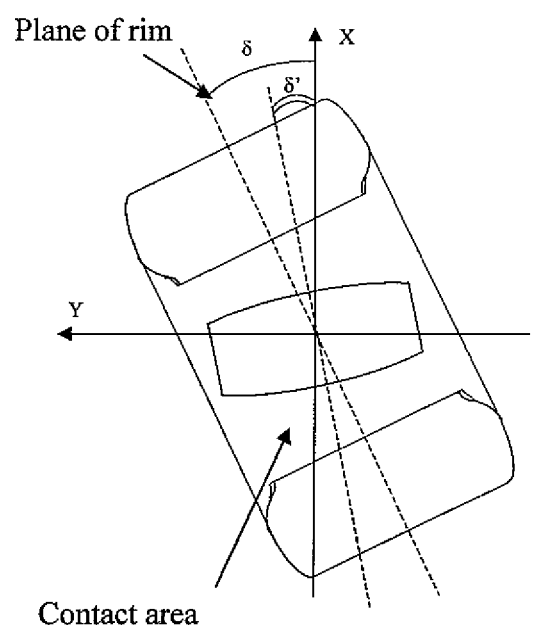
FIG. 6 is a schematic top view of a tire undergoing torsion.

The development of the self-aligning torque Mz results in a twisting, having an angle Δδ. of the tire cover about the Z-axis, in relation to the plane of the rim (cf. FIG. 6):

$$\Delta \delta = \frac{M_z}{k_T}$$

The torsional rigidity of the tire cover contains a structural component $K_{T0}$ [N·m/rad] and a component $K_{TZ}$ [m/rad] which expresses the variation in torsional rigidity by the load, for example, having the form:

$$k_T = (k_{T0} + k_{TZ} F_Z) \sqrt{p}$$

The actual slip angle δ' assumed by the contact area is expressed in relation to the slip angle at the axis of the wheel, in the following way:

$$\delta' = \delta + \frac{M_z}{k_T}$$

The deformation of the crown can be modeled by a quadratic law, with a curvature at the center of the contact area, which is expressed, for example, in the following way:

$$\rho = S_2 Fy$$

where $S_2$ is a parameter representative of the edgewise bending flex.

Radial rigidity relates the load Fz to the deflection of the crown in relation to the rim. It depends on pressure and is broken down into two terms: a structural term $R_{R0}$ [N/m] which corresponds to the radial rigidity of the tire at zero pressure, and a pneumatic term $R_{RP}$ [N/m/bar]

$$R_R = R_{R0} + R_{Rp} p$$

The length of the contact area is defined by:

$$Lx = a \sqrt{\frac{F_z}{p^c}} + b \frac{F_z}{p^c},$$

this formulation enabling the effect of the load and inflation pressure to be taken into account.

The width of the contact area is defined by:

$$Ly = Ly_c + 2 * LY_e$$

where $Ly_c$ is the width of the ribs at the center of the tire and $Ly_e$ is the width of the ribs at the shoulders, calculated by the above formula:

$$Ly_e = \operatorname{arctan}\left[ d \left( \frac{F_z}{p^{0.6}} - e \right)^2 \right]$$

The effective surface of the contact area is defined as the product of the width by the length, weighted by the grooving and a form factor:

$$S_{ADC} = C_{form} \, ent \, Lx \, Ly$$

The form factor $C_{form}$ takes account of the variation in shape of the contact area in relation to the load.

During deflection of the tire structure, the crown assumes an angle $\alpha_1$ which a characteristic quantity of the designed structure.

The pressure profile between the entry and exit of the contact area is determined in the following way:

$$p(x) = \frac{2n+1}{2n} \frac{F_Z}{S_{ADC}} \left(1 - \left(\frac{x}{Lx/2}\right)^{2n}\right),$$

This pressure distribution is such that:

$$\int_{-Lx/2}^{Lx/2} p(x) \, dx = \frac{F_Z}{S_{ADC}}.$$

Under a light load, the profile is rather parabolic in nature (n=1). Under a heavy load, the pressure profile is nearly uniform.

Preferably, n is a real number varying linearly with the length of the contact area Lx. Under light loads, in order to prevent n from becoming too low (or even negative), the lower limit of n is set at 1, in the following way:

$$n = \max(1, n_a Lx + n_b).$$

The method of the invention uses at least one mechanical model (first model), preferably coupled with a thermal model (second model).

Each of these models is established over the course of a preliminary phase of the method and assumes the form of a system of equations.

These models can be established in several ways, and in particular by using physical laws known to a person skilled in the art, or relatively approximate laws established by specific experiments, whereby the equations by which these models are expressed can assume multiple forms.

Therefore, these models are substantially characterized by their input variables, their output variables, and by the fact that they each assume the form of a system of equations which takes into account observable physical phenomena based on quantifiable physical properties.

The output variables of the mechanical model are the longitudinal forces Fx, the lateral forces Fy, and the self-aligning torque Mz.

The output variables of the thermal model are the peripheral or surface temperature Ts of the tire tread, and the internal temperature Ti of this tread.

Figure 7:
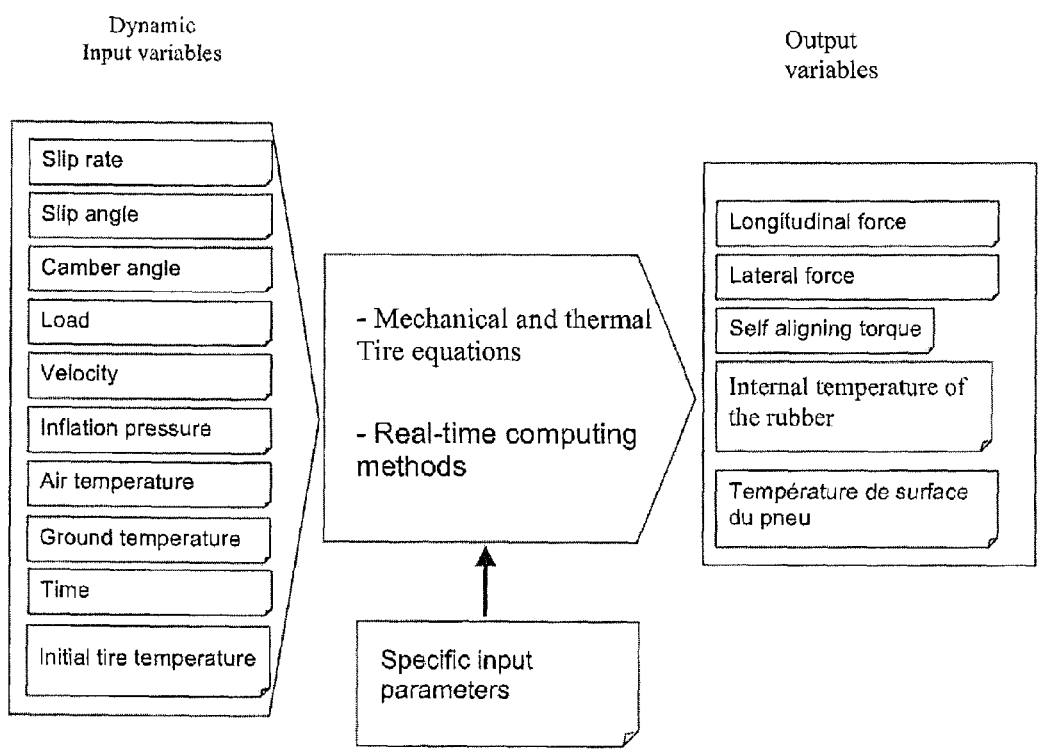
FIG. 7 is a diagram summarizing the various quantities involved in implementing the method of the invention.

The input and output variables of the two models are enumerated in FIG. 7.

Figure 8:
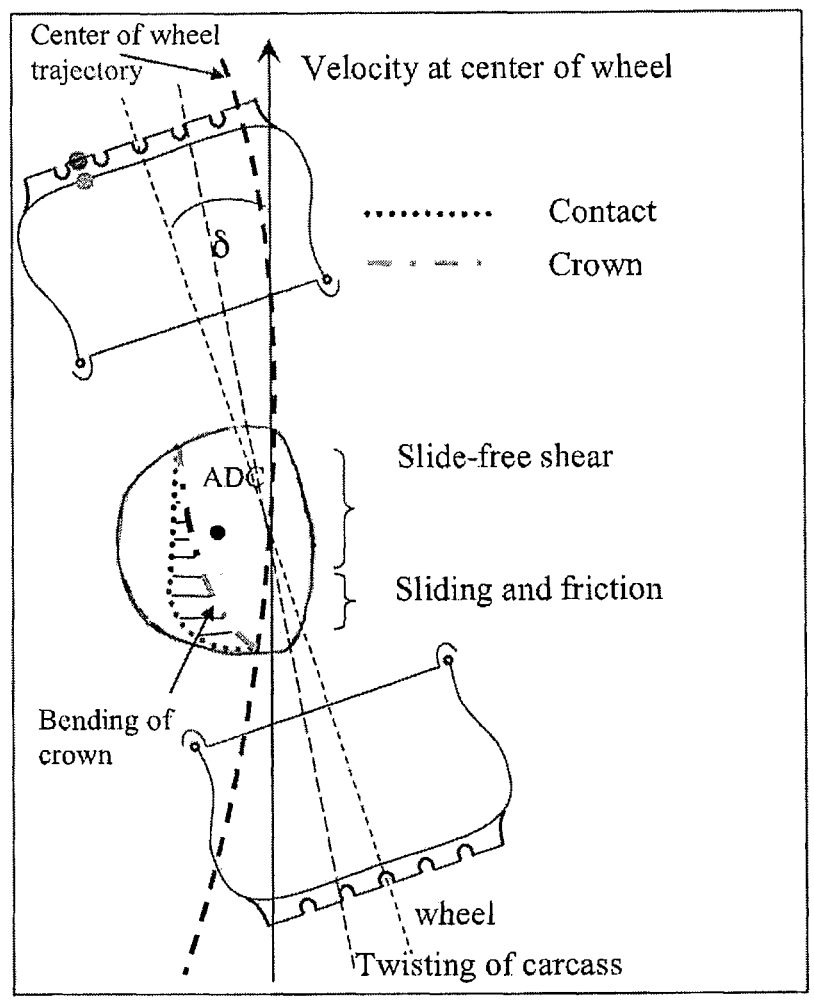
FIG. 8 is a schematic top view of a tire undergoing various stresses.

The thermal model is further characterized by the fact that, on the one hand, it is established under the assumption that the contact area includes two regions (FIG. 8), namely an adherent contact region wherein the force is controlled by the shear of the tire tread when movement is imparted, and a sliding contact area wherein the force is controlled by the friction coefficient between the rubber and the ground, and, on the other hand, by assuming that there is a single abscissa "b" point N marking the passage between the adherent contact area and the sliding contact area.

The equations are formulated according to this principle, which makes it possible to obtain quickly solvable expressions.

An exemplary mechanical model is provided below.

In this example, modeling of the operation of the contact area is based on a "brush bristle" type of approach, with a first shear phase at the entry to the contact area and a second sliding phase. It is assumed that these two phases are separate, unique and related, and that there is no unwanted shear resumption mechanism during the sliding phase.

All of the developments which follow make the assumption that the slip angles remain moderate (less than approximately 20 degrees), with the result being that the approximation $\tan(\delta) \approx \delta$ is valid and will be made routinely. Kx and Ky designate the stiffnesses of the tire tread, which can be related to the modulus of the rubber and to the characteristics of the preferred tread pattern, according to the following relationship:

$$\begin{cases} K_X = \dfrac{G^* ent}{\dfrac{h_{scre}}{AssX} + h_{sc}} \\ K_Y = \dfrac{G^* ent}{\dfrac{h_{scre}}{AssY} + h_{sc}} \end{cases}$$

$h_{scre}$ being the thickness of the tread pattern, and $h_{sc}$ the thickness of the underlayer, such that $e_{KM} = h_{scre} + h_{sc}$.

Figure 9:
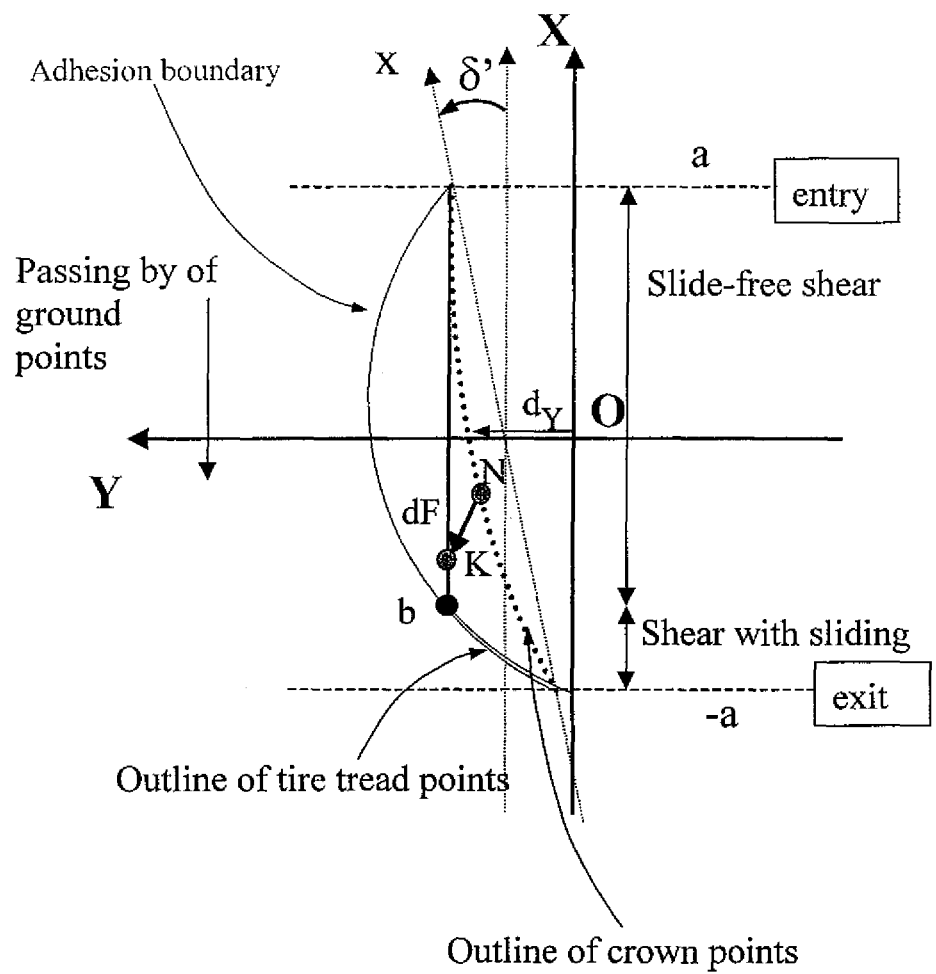
FIG. 9 is an enlarged top view of the contact area of a tire undergoing various stresses, and on which the characteristic points and paths appear.

FIG. 9 is a block diagram of the contact area. Segment NK defines an element of the tire tread ("brush bristle"). N is the point situated at the level of the crown and K is the point of the tire tread at the ground level. The abscissa point b represents the transition between the contact with adhesion and the sliding contact.

At the entry to the contact area (see FIG. 9), the rubber element of the tire tread is not sheared ($X_N = X_K$).

The shearing of the rubber does in fact have two sources: a drift of the wheel by an angle $\delta$ and a difference between the velocity of point N of the crown and the pass-by speed of the ground points.

Assuming a uniform deformation within the thickness of the tire tread, the basic force generated by the shear of an element of this tread can be written:

$$dF_X = K_X (X_K - X_N) dS$$

$$dF_Y = K_Y (Y_K - Y_N) dS$$

where dS is the elemental surface of element NK of the tread.

The equation for the trajectory of the crown points can then be approximately by the following relationship:

$$Y_N = \delta' X_N - \frac{1}{2} S_2 F_Y X_N^2 + \frac{F_Y}{R_L},$$

an expression in which $\delta'$ is the slip angle of the crown, which differs from the slip angle due to the twisting of the tire structure, and which conforms to the equation:

$$\delta' = \delta + \alpha 1 + \frac{M_Z}{k_T}.$$

Assuming that the relationship $Y_K(a)=Y_N(a)$ is satisfied at the entry to the contact area, it follows that (equation 1):

$$Y_K - Y_N = \delta'(a - X_N) - \frac{1}{2}S_2 F_Y(a^2 - X_N^2)$$

By postulating:
V as the speed of the ground points, $W_x$ as the velocity of the crown points along the axis thereof, and $$\tau = \frac{W_X - V}{V},$$

the expression $X_K - X_N$ becomes (equation 2):

$$X_K - X_N = (a - X_N)\frac{\tau}{1+\tau}$$

By definition, $\tau$ corresponds to the longitudinal slip rate. The sliding velocity components are given by:

$$\begin{cases} Vg_X = \dfrac{d(X_K - X_N)}{dt} = W_X - V \\ Vg_Y = \dfrac{d(Y_K - Y_N)}{dt} = (\delta' - S_2 F_Y X_N)W_X \end{cases}$$

In the sliding portion of the rolling area, the basic forces are generated by friction between the rubber and the ground and the direction of the forces is collinear with the shear vector, which is expressed by:

$$\frac{dF_X}{dF_Y} = r_K \frac{(X_K - X_N)}{(Y_K - Y_N)} \text{ avec}$$

$$r_K = \frac{K_X}{K_Y}.$$

Noting $$_t\beta = \delta' - \frac{1}{2}S_2 F_Y(a + X_N),$$

it follows that:

$$\frac{dF_X}{dF_Y} = r_K \frac{\tau}{(1+\tau)\beta}.$$

The basic forces in the friction region are written:

$$dF_X = \frac{r_K \tau}{\sqrt{(r_K \tau)^2 + (1+\tau)^2 \beta^2}} \mu(p, Vg, T) p\, dS$$

$$dF_Y = \frac{(1+\tau)\beta}{\sqrt{(r_K \tau)^2 + (1+\tau)^2 \beta^2}} \mu(p, Vg, T) p\, dS$$

The abscissa b of point N, from which it is assumed that the sliding of the tire on the ground occurs, corresponds to the equilibrium between the basic shear and adhesion forces, this equilibrium being represented by equation 3:

$$[K_X(X_K - X_N)]^2 + [K_Y(Y_K - Y_N)]^2 = [\mu_0 p]^2$$

where $\mu_0$ is the static adhesion coefficient expressed at abscissa point b.

Although, in the contact area, there may exist a priori several transition points between an adhesion region and a sliding region, the mechanical model used in the invention advantageously assumes the uniqueness of this transition point. In other words, as soon as sliding appears in the contact area, this sliding persists up to the exit from this contact area.

The equations representative of the balance of forces, with the exception of this assumption of the uniqueness of the passage point, are given below.

However, it is possible to provide a more general version of them, which corresponds to the case where several passage points might exist in the contact area.

The forces applied at the center of the wheel equipped with the tire in question are obtained by integrating the basic forces developing at the surface of the contact area:

$$F_X = \int_{-Ly/2}^{Ly/2} \int_b^a K_X(X_K - X_N)\, dS +$$

$$\int_{-Ly/2}^{Ly/2} \int_{-a}^b \frac{r_K \tau}{\sqrt{(r_K \tau)^2 + (1+\tau)^2 \beta^2}} \mu(p, Vg, T) p\, dS$$

$$F_Y = \int_{-Ly/2}^{Ly/2} \int_b^a K_Y(Y_K - Y_N)\, dS +$$

$$\int_{-Ly/2}^{Ly/2} \int_{-a}^b \frac{(1+\tau)\beta}{\sqrt{(r_K \tau)^2 + (1+\tau)^2 \beta^2}} \mu(p, Vg, T) p\, dS$$

The integration results in the following equations 4 and 5, respectively:

$$F_X = K_X Ly \left[ \frac{1}{2}\frac{\tau}{1+\tau}(a-b)^2 \right] +$$

$$Ly \text{ ent} \int_{-a}^b \frac{r_K \tau}{\sqrt{(r_K \tau)^2 + (1+\tau)^2 \beta^2}} \mu(p, Vg, T) p\, dx$$

$$F_Y = K_Y Ly \left[ \begin{array}{c} \frac{1}{2}\delta'(a-b)^2 - \\ \frac{S_2 F_Y}{6}(2a^3 - 3a^2 b + b^3) \end{array} \right] +$$

$$Ly \text{ ent} \int_{-a}^b \frac{(1+\tau)\beta}{\sqrt{(r_K \tau)^2 + (1+\tau)^2 \beta^2}} \mu(p, Vg, T) p\, d$$

The self-aligning torque $M_z$ has two contributions, namely a moment $N_Y$ related to the force $F_Y$, the center of thrust of which is offset in relation to the center of the contact area, and a torque $N_X$ related to the widthwise distribution of forces $F_X$ in the contact area. In general, torque $N_X$ is a restoring torque, except in particular cases of high engine torque.

Within the same framework of assumptions as previously, moment $N_Y$ can be calculated directly by equation 6:

$$N_Y = K_Y L_y \left[ \begin{array}{c} \frac{1}{6}\delta'(a^3 - 3ab^2 + 2b^3) - \\ \frac{S_2 F_Y}{8}(a^2 - b^2)^2 \end{array} \right] +$$

$$L_y ent \int_{-a}^{b} \frac{(1+\tau)\beta}{\sqrt{(r_K\tau)^2 + (1+\tau)^2\beta^2}} \mu(p, V_g, T) p x \, dx$$

Torque $N_X$ is created by a non-uniform widthwise distribution of forces $F_X$ in the contact area, which tends to become amplified when the contact area assumes a trapezoidal shape under the influence of the offset or camber. In a modeling approach with a single raised tire tread, the widthwise distribution of forces $F_X$ in the contact area is not directly accessible. Thus, torque Nx is modeled by an ad hoc relationship the mathematical formulation of which is given below for guidance, in relation to the moment $N_Y$ and to the camber (equation 7):

$$Nx = \beta_1(Fz)Ny + \beta_2(Fz,\delta)\gamma$$

Several formulas exist for the parameters $\beta_1$ and $\beta_2$.

An exemplary thermal model is provided below.

This model includes a local thermal model, which substantially takes account of the thermal phenomena related to the contact of the tire tread with the ground, in the contact area, and to the relative sliding of the tire tread in a portion of the contact area, and a global model, which takes account of all of the temperature rise and heat transfer phenomena of the tire during one wheel revolution.

The formulation for the global forces of the tire is based on a breakdown into the shear force of the tire tread and the frictional force. The frictional force is a function of the adhesion coefficient $\mu$ between the rubber and the ground, this coefficient depending on the pressure, sliding velocity and contact temperature.

The contact temperature in the contact area is modeled in the following way (local thermal model).

During passage of the rubber into the contact area, the contact temperature changes based on the thermal conduction and friction between the rubber and the ground. The temperature in the contact area can be calculated in various ways, e.g., by using finite-difference methods of discretization.

The method described below optimizes computation time while at the same time resulting in a high adequate degree of accuracy.

Assuming two semi-infinite materials with a homogeneous temperature (Ts for the rubber and Tsol for the ground), the surface temperature, when the two masses are abruptly placed in perfect contact with one another, is written:

$$T_0 = \frac{T_S e_g + T_{sol} e_{sol}}{e_g + e_{sol}},$$

where $e_g$ and $e_{sol}$ are thermal effusivity of the rubber and the ground, respectively.

When there is sliding between the rubber and the ground, the frictional flux $\phi_F$ produces an increase in the surface temperature, which, when the flux is constant, is expressed by:

$$T_C(t) = T_0 + 2\frac{\alpha}{e_g}\varphi_F \sqrt{\frac{t}{\pi}},$$

where α is the distribution coefficient which determines the proportion of flux which penetrates into the rubber. In the case of a perfect contact, which coefficient is expressed by:

$$\alpha = \frac{e_g}{e_g + e_{sol}}.$$

Figure 10:
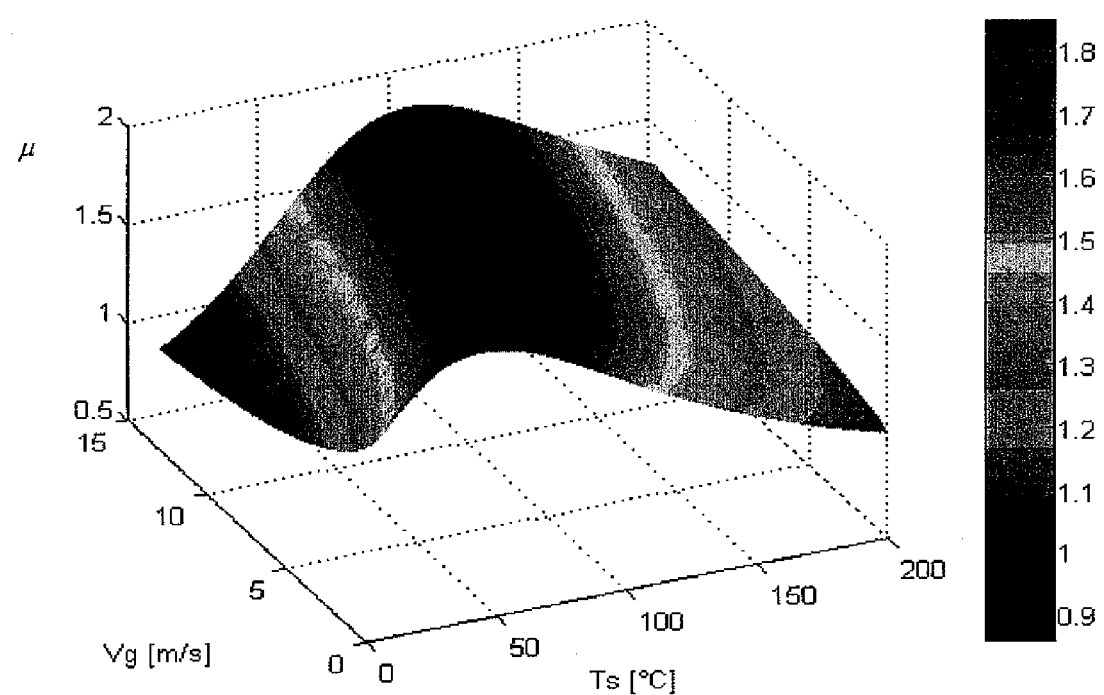
FIG. 10 is a three-dimensional representation of the law linking the adherence coefficient to the contact pressure, the contact temperature and the sliding velocity.

For the rubber/ground law of adhesion, for which FIG. 10 illustrates the dependency with respect to parameters Vg and Tc, several mathematical formulations obvious to a person skilled in the art make it possible to reproduce the evolution together with the temperature, velocity and pressure, from specific experiments.

For example, it is possible to use the formula:

$$\mu(T_C, V_g, P_c) = (e_1 \cdot P_c^{e_2} + e_3)\left[\mu_1 + (\mu_2 - \mu_1)\exp\left(-a^2\log^2\left(\frac{T_C}{T_1}\right)\right)\right]$$

$$T_1 = T_0 + a_2 \log_{10}(V_g/V_0)/[a_1 - \log_{10}(V_g/V_0)], \text{ where}$$

$\mu_1, \mu_2, T_0, a, a_1, a_2, e_1, e_2, e_3, V_0$ are constants of the model.

As shown in FIG. 10, the adhesion coefficient $\mu$ has a complex evolution together with the temperature and sliding velocity: at low temperatures, this coefficient increases together with the temperature; at high temperatures, it is the reverse. Therefore, the coefficient $\mu$ passes over a maximum with the temperature. This maximum is different depending on the value of the sliding velocity. The higher the sliding velocity, the more the maximum for this coefficient is obtained at high temperatures.

The global thermal model calculates the temperature profile in the thickness of the rubber as an average per wheel evolution, and in the width of the tire tread. This model makes it possible to obtain the temperature Ti on the inside of the tire tread, which determines the rigidity G* (Ti), as well as the surface (or peripheral) temperature Ts of the tire tread at the entry to the contact area, which is used for thermal calculation in the contact area (local model).

Figure 11:
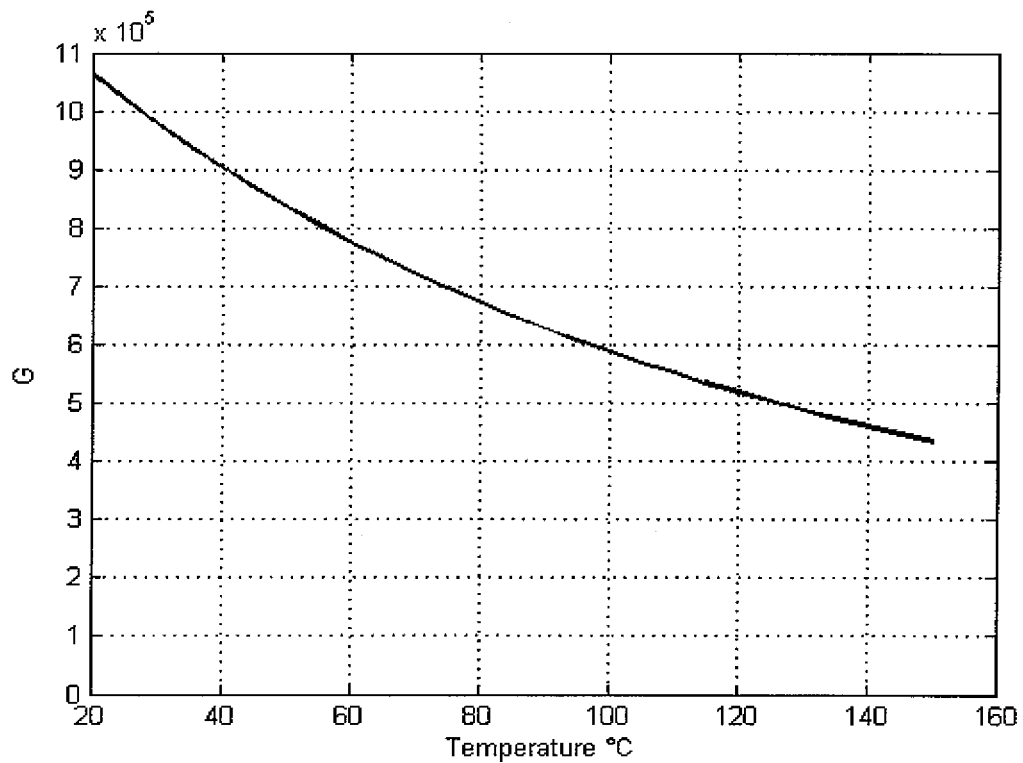
FIG. 11 shows the law linking the shear modulus of the tire rubber to temperature.

An exemplary law relating rigidity to temperature is illustrated in FIG. 11. As a matter of fact, this law is specific to each material used and depends on the formulation of the compounds comprising the tire rubber. Generally speaking, when the temperature of the compound increases, the rigidity thereof decreases.

The global thermal model takes into account the following mechanisms:
  conduction in the rubber;
  temperature rise due to friction between the rubber and the ground;
  temperature rise due to losses in the rubber; and
  cooling via ground conduction and air convection.

Figure 12:
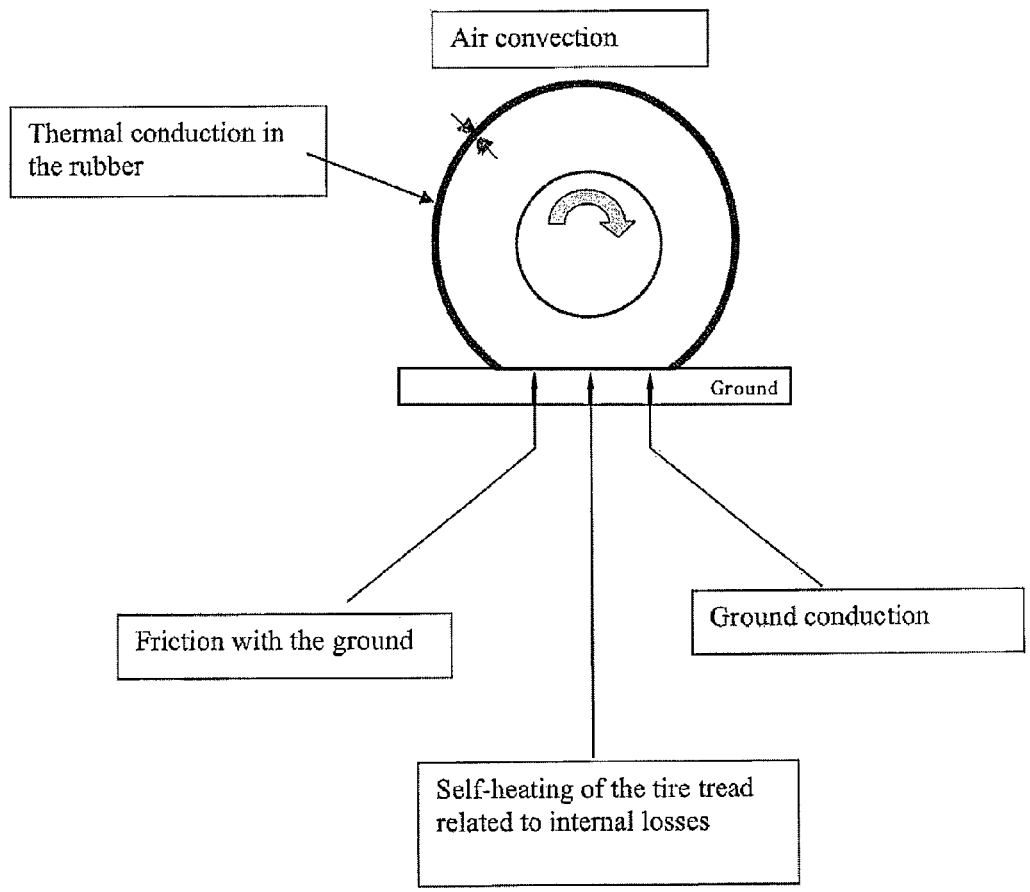
FIG. 12 is a diagram summarizing the thermal phenomena taken into account in the global thermal model.

FIG. 12 recalls all of these mechanisms schematically.

Assuming homogeneity of temperature in the width of the tire tread and over one wheel revolution, it is possible to obtain the unidimensional heat equation in the polar coordinate system related to the wheel:

$$\frac{\partial T}{\partial t} = \frac{\lambda}{\rho c_p} \frac{\partial^2 T}{\partial x^2} + \frac{\dot{q}}{\rho c_p},$$

where

T represents the temperature profile in the thickness of the tire tread [° K];

$\lambda$ is the thermal conductivity of the rubber [W/m/° K];

$\rho$ is the mass density [kg/m$^3$]

$C_p$ is the specific heat capacity of the rubber [J/kg/° K];

$\dot{q}$ is the heat production term due to losses in the rubber in [W/m$_3$];

x represents the radial direction (i.e., in the thickness of the tire tread);

Thermal effusivi $e = \sqrt{\lambda \rho c_p}$

Thermal diffusivity $$a = \frac{\lambda}{\rho c_p} = \frac{\lambda^2}{e^2} [m^2/s]$$

The limiting conditions are however different, depending on whether it is the exterior surface of the tire or the interface between the tire tread and the tire breaker strips being considered.

In the first case, the limiting conditions of the surface of the tire change over one wheel revolution: outside the contact area, a surface flux exists, which is due to convection with the surrounding air; in the contact area, there is a surface flux related to ground conduction and friction between the rubber and the ground. At the rubber/(ground+air) interface, the limiting flux conditions imposed at the surface of the tire can be written formally, as follows:

$$-\lambda \frac{\partial T}{\partial x} = \varphi \ [W/m^2]$$

where $\varphi$ is a surface flux which remains to be explained.

Thermal radiation exchanges can be ignored.

On the other hand, at the interface between the tire tread and the tire breaker strips, a zero flux can be assumed (adiabatic condition).

Calculation of the heat production term $\dot{q}$ [W/m$^3$] due to losses in the rubber can be made as follows.

When the rubber passes into the contact area, it undergoes compressive and shear strains which are a source of heat. The internal power dissipated into the rubber over one wheel revolution is calculated, by the loss function P, as the product of the energy supplied during passage into the contact area Wf and the wheel revolution frequency:

$$\dot{q} = PW_f$$

The elastic strain energy density experienced by the rubber in the contact area is explained in relation to the longitudinal and lateral forces and load of the tire, which enables the final formulation to be obtained:

$$\dot{q} = P(W_f, T) \frac{1}{2G^*} \frac{V}{2\pi R_0} \frac{F_X^2 + F_Y^2 + F_Z^2/3}{S_{ADC}^2}$$

where $P(W_f, T)$ is the loss function, which takes into account the operating point of the rubber in terms of temperature and stress amplitude, and which can be characterized by specific experiments.

The temperature T corresponds to the characteristic temperature of the compound and, among other things, determines the loss and modulus levels. Knowing that the loss and modulus laws are, for example, measured at a frequency of 10 Hz, the temperature T is, in fact, an equivalent temperature, within the meaning of the WLF law, so as to have an estimation of the losses and modulus for different stress frequencies:

$$T = T_1 + C_2 \log_{10}(f/10)/[C_1 - \log_{10}(f/10)],$$

where $T_i$ is the internal temperature of the compound derived from the global thermal calculation, and where $f = V/(2\pi R_0)$ is the rotational frequency.

As will be easily understood by a person skilled in the art, upon reading this description, the same relationship is used in order to relate the shear modulus of the rubber to the internal temperature Ti, so as to account for the stiffening mechanisms of the compound when the wheel revolution frequency increases.

To calculate the ground conduction flux, the tire tread and the ground can be assimilated to two semi-infinite walls placed in contact during the time interval $t_{adc}$. Assuming the contact to be perfect, the conduction flux is written:

$$\varphi_{cond} = -2 \frac{e_g e_{sol}}{e_g + e_{sol}} \frac{1}{\sqrt{t_{adc} \pi}} (T_S - T_{sol})$$

where Ts is the surface temperature of the rubber.

Calculation of the air convection flux is rendered more difficult by the fact that the heat exchange with the air depends greatly on the nature of the air flow around the tire. Generally speaking, the modeling of convective exchanges is based on semi-empirical formulas. In the particular case of the tire, the following formula can be used:

$$\phi_{conv} = C_{air} 4.126 (2R_0)^{-0.2} V^{0.805} (T_S - T_{air})$$

where $C_{air}$ is a constant which takes into account the effect of forced convection.

Calculation of the frictional flux must take account of the fact that the friction consisting of the sliding of the rubber over the ground is a source of heat production. In strict logic, the energy is dissipated in the mass of rubber over thicknesses smaller than a millimeter. In the case of dry contact, the approximation can be made that the energy is dissipated at the extreme outer surface and that it is modeled by a frictional flux. The mean frictional flux in the sliding region of the contact area is written as follows:

$$\varphi_{frot} = \alpha \frac{V_g F_\mu}{(1 - ppa) LxLy \, ent}$$

where $\alpha$ is a flux distribution coefficient between the rubber and the ground; a value of $\alpha = 1$ means that the entire frictional flux is oriented towards the rubber; a value of $\alpha = 0$ means that the entire frictional flux is oriented towards the ground;

$F_\mu$ is the component of the force induced by the friction between the rubber and the ground; Vg is the sliding velocity; and ppa is the proportion of adherent points in the contact area.

The mean thermal flux at the surface of the tire tread is defined as the average of the various fluxes, weighted by the characteristic time period during which these fluxes are effective during one wheel revolution, which is expressed by the relationship:

$$\varphi = \frac{\varphi_{frot}(1-ppa)t_{adc} + \varphi_{cond}t_{adc} + \varphi_{conv}t_{Hadc}}{t_{adc} + t_{Hadc}}$$

where $t_{adc}$ corresponds to the dwell time for one tire tread element in the contact area; where $t_{Hadc}$ is the dwell time of one tire tread element outside the contact area; and where $(1-ppa)t_{adc}$ is the time period during which one tire tread element slides in the contact area.

Figure 13:
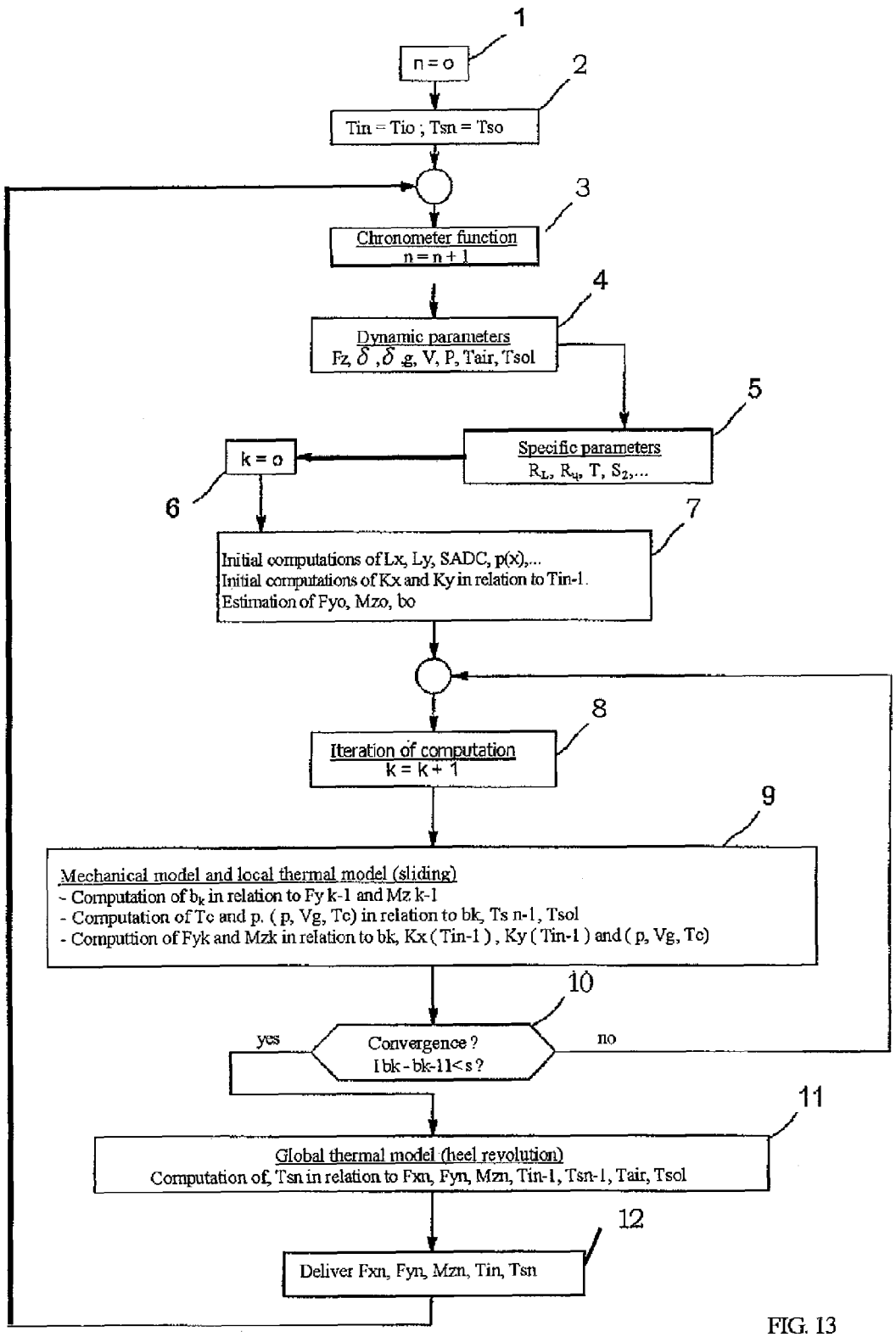
FIG. 13 is an overall illustration of the operational implementation of a method in accordance with an embodiment of the invention.

FIG. 13 is an overall illustration of the operational implementation of a method in accordance with the most complete embodiment of the invention.

Upstream from the operational implementation thereof, this method includes a preliminary phase during which are established the mechanical model or first model, the local thermal model or second model, and the wheel revolution global thermal model, or third model.

Each model is established by applying physical laws which are known and/or established by specific experiments, and takes the form of a system of equations such as those presented above for each model.

As a reminder, the mechanical model supplies the expressions for the longitudinal forces and lateral forces which are transmitted by the tire, between the ground and the vehicle, for the self-aligning torque, which is related to the intensity of these forces and to the distribution thereof within the contact area, and for the equilibrium of basic shear and sliding forces of the tire at the presumed unique point N of passage between the adherent and sliding contact regions, these expressions being given in relation to dynamic parameters, which are related to the physical rolling and operational conditions of the tire, to specific parameters of the tire, and to the abscissa b of the point of passage.

The local thermal model supplies the expression for the variations in the contact temperature of the tire tread with the ground, from the entry to the exit of the contact area, these variations depending in particular on the peripheral temperature of the tire tread, the ground temperature, and the sliding of the tire tread on the ground.

The global thermal model supplies the temperature profile within the thickness of the tire tread and the variations, over one wheel revolution period, of the peripheral temperature of the tire tread and the internal temperature of the tire, in relation, in particular, to previously known or estimated values of the peripheral and internal temperatures, of the thermal conduction coefficient of the tire tread, and of the thermodynamic component phenomena, such as the internal deformations undergone by the tire, the heat exchanges between the tire and the environment thereof, and the sliding of the tire tread on the ground.

The operational phase of the method, which relies on the results of the preliminary phase and which is illustrated in FIG. 13, first of all includes an operation 1 consisting in initializing a counting index n used to measure time.

At operation 2, initial values Tso and Tio are assigned to the peripheral temperature of the tire tread and to the internal temperature of the tire, e.g., by assuming that the tire is initially at thermal equilibrium with the ambient air.

Operation 3 increments the time counted by the chronometer by a time interval corresponding to at least that required for carrying out subsequent calculations, as described hereinbelow.

Values previously measured or stored are next assigned to the dynamic parameters (operation 4) and to the specific parameters (operation 5).

Operation 6 consists in initializing a counting index k used to count the number of successive computation cycles carried out within an iteration loop which will be described hereinbelow.

Operation 7 comprises a preparatory phase intended in particular to enable the computation of quota quantities the value of which can be considered as constant for the various computation cycles of a single iteration loop, which makes it possible to avoid the repeated execution of these computations at each computation cycle of a single iteration loop.

In particular, the preparatory phase 7 is used to calculate the dimensions Lx and Ly of the contact area, the surface $S_{ADC}$ thereof, the pressure profile p(x) along the contact area, as well as the rigidities of the tire tread in relation to the internal temperature Ti at the prior moment n−1, i.e., Tin−1.

Estimated values Fyo, Mzo and bo are further assigned to the lateral forces Fy, the self-aligning torque Mz, and the abscissa b of the point N of passage between the adherent contact region and the sliding contact region.

When the input parameters vary little in relation to time, the estimated values Fyo, Mzo and bo may consist of the values calculated at the preceding moment.

In the opposite case, the starting sliding abscissa bo is determined by assuming that the lengthwise pressure profile in contact area is parabolic and by ignoring the torsional rigidity and rigidity of the crown.

In this case, the sliding equation (equation 30 has a closed-form solution:

$$b_0 = a\left(\frac{4}{3}\frac{a^2}{\mu_0 F_z/Ly}\sqrt{\left[K_X\frac{\tau}{1+\tau}\right]^2 + [K_Y(\delta + \alpha_1)]^2} - 1\right)$$

Knowing $b_0$, force $F_{y0}$ and torque $M_{z0}$ are then calculated from equations 5 to 7.

It must be further verified that the initial position for the point of passage satisfies the constraint on the sign of the lateral shear of the tire tread, namely $(Y_K-Y_N)\delta'>0$. If such is not the case, the anticipated solution makes no physical sense. It is then necessary to impose: $Y_K-Y_N=0$, and the initial value $M_{z0}$ of the self-aligning torque is set at 0.

Operation 8 increments the counting index k and makes it possible to approach a first or a new computation cycle (steps 9 and 10) of the iterative phase.

Via successive approximations, and from previously known or estimated values for the abscissa b of the point of passage, for the lateral forces Fy, and for the self-aligning torque Mz, this iterative phase makes it possible to solve new values for these quantities b, Fy and Mz, which solve the previously presented equations 1 to 7, for the values assigned to the dynamic parameters and specific parameters.

These equations are formulated by showing the abscissa b of the point of passage between the adherent contact region and the sliding contact region, the forces in the contact area being broken down into two contributions, namely a shear force, which depends on the rigidities of the rubber, crown and carcass of the tire, and a frictional force, which depends on the law of friction (μ).

The abscissa b is calculated from equations 1 to 3 and from the values of Fy and Mz estimated at the preceding iteration. This is a scalar equation, the solution of which is limited (−a≤b≤a). Calculation of the abscissa b is, for example, carried out by combining a bisection and a secant.

If the movement proposed by the secant method exceeds the lower and outer limits, the method shifts to a bisection step.

Since several solutions for the abscissa b are a priori possible, the solution adopted is the one which satisfies the condition $(Y_K-Y_N)\delta'>0$.

The integrals $$\int_{-a}^{b} \mu(P(x), T, Vg)P(x)dx$$

and $$\int_{-a}^{b} \mu(P(x), T, Vg)P(x)x dx$$

related to the friction of the tire tread rubber on the ground are, for example, calculated by using Gaussian quadrature formulas.

To calculate the residuals of the system consisting of equations 4, 5 and 6+7, and to calculate convergence, it is a matter of solving the non-linear system of n unknown equations formally notated as: F(x)=0.

Although several iterative methods are possible, the optimal method appears to consist of the combined Newton-Raphson/Broyden iterative method.

The Newton-Raphson method is based on the local approximation of F by a tangent linear model. This approximation results in an iterative method having the form:

$$x_{k+1} = x_k - J(x_k)^{-1} F(x_k),$$

where $$J(x_k) = \frac{\partial F(x_k)}{\partial x}.$$

In order to reduce cost by iterating the Newton-Raphson method, the Broyden method can be used. In this method, a secant approximation of F is assumed, between two successive iteration values $s_{k-1}$ and $x_k$, and calculation of the Jacobian J is thereby avoided.

A Broyden iteration has the form: $x_{k+1}=x_k-B_k^{-1}F(x_k)$.

The difference with the Newton method lies at the matrix B level, which is an approximation of the Jacobian J. The conventional Broyden method updates the matrix B at each iteration by using:

$$B_{k+1} = B_k + \frac{(y_k - B_k s_k)s_k^T}{s_k^T s_k}.$$

The vectors s and y are defined by $s_k=x_{k+1}-x_k$ and $y_k=F(x_{k+1})-F(x_k)$.

This method a super-linear convergence if the initial point is sufficiently close to the solution. It is necessary to have an initial estimation of B, the best choice being $B_0=J_0$.

In actual practice, it is desirable to proceed with the first iterations with the Newton-Raphson method, and, when the convergence is deemed sufficient, to shift to the Broyden method.

A criteria for shifting from the Newton-Raphson method to the Broyden method is given by: $\|F(x_{k+1})\| \leq \eta \|F(x_k)\|$, where $\eta>0$ is a low-value parameter.

If it proofs true that b=a, the sliding equation has a trivial solution, which is generally desirable to avoid. To accomplish this, this equality is avoided, in the search for the sliding point, e.g., by imposing bmin=0.9995*a.

Upon each computing cycle of order k, step 9 includes, in particular, an operation consisting of calculating a new temporary value $b_k$ for the abscissa of the point of passage, from equilibrium equations 1 to 3 for the basic forces and previously known or estimated values $F_{YK-1}$ and $M_{ZK-1}$ for the lateral forces and the self-aligning torque.

In the preferred embodiment, wherein the mechanical model is enhanced by the local thermal model and, in particular, takes account of the influence of the change in contact temperature on the value of the friction coefficient of the tire rubber on the ground, step 9 likewise includes, for each point of the sliding contact region, the calculation of the contact temperature Tc and the friction coefficient μ, based on the newly calculated temporary value $b_x$ for the abscissa of the point of passage, the peripheral temperature $T_{sn-1}$ as known at the preceding moment, and the ground temperature $T_{sol}$, the peripheral temperature $T_{sn-1}$ of the tire being used to calculate the contact temperature at the entry to the contact surface.

Finally, step 9 includes the operation which, from the new temporary value $b_k$ of the abscissa of the point of passage, from the values for the rigidities Kx and Ky of the tire tread for the internal temperature Tin−1, as known at the previous moment, from the value of the friction coefficient μ, and from equations 1 to 7, consists in calculating new values $F_{YK}$ and $M_{ZK}$ for the lateral forces and the self-aligning torque, which can be used for a possible later computing cycle.

Step 10 consists in testing the convergence of the iterative phase.

For example, if the respective deviations between the new values $b_k$, $F_{YK}$ and $M_{ZK}$ and the temporary values $b_{k-1}$, $F_{YK-1}$ and $M_{ZK-1}$ derived from the preceding computing cycle are lower than the respective limits such as ε, then the iterative phase is interrupted. In the opposite case, this iterative phase is pursued by looping back upstream to operation 8.

Upon interruption of the iterative phase, the wheel revolution global thermal model is used (step 11) to calculate the new updated values $T_{sn}$ and $T_{in}$ for the peripheral and internal temperatures, while taking into account the changes undergone by these temperatures from the end of the preceding iterative phase, under the influence of all of the thermodynamic component phenomena, such as the internal deformations undergone by the tire, the heat exchanges between the tire and the environment thereof (air, ground), and the sliding of the tired tread on the ground.

It is recalled that the temperature Ts is the average surface temperature, both widthwise and around the circumference of the tire, the tire tread, and that the calculation of temperatures Ti and Ts relies on unidirectional modeling within the thickness of the tire tread.

The equations for the global thermal model are solved by a conventional finite-difference method approach using a spatial grid within the thickness of the rubber, and a time-resolution method of the Runga-Kutta order 2 type.

Operation 12, which is implemented upon completion of the iterative phase, consists in delivering, for moment n, the values for the longitudinal and lateral forces Fxn, Fyn, the self-aligning torque Mzn, the internal temperature Tin of the tire, and the peripheral temperature Tsn of the tire tread.

The method is then looped back just upstream from the chronometer incrementing operation 3, and before the dynamic parameter updating operation 4, which makes it possible to account for the changes undergone by these parameters during the iterative phase execution time which just ended.

The new value Tin for the internal temperature of the tire will be used for the specific parameter updating operation 5, or during the course of the preparatory phase 7, in order to deduce therefrom the new value for the rigidity G* of the compound comprising the tire rubber, which conditions the values for rigidities Kx and Ky.

Furthermore, the new value Tsn for the peripheral temperature of the tire tread will be used during step 9, for calculating the contact temperature Tc at the entry to the tire tread.

Therefore, it is understood that the association between the process for determining the forces and the process for determining the temperatures comes into play at two levels, namely by taking account of the fact that the average temperature Ti of the tire tread influences the rigidity G* of the compound and therefore the rigidities Kx and Ky of the tire tread, and by taking account of the fact that the peripheral temperature Ts of the tire tread in the contact area influences the adhesion coefficient between the rubber and the ground.

The simulation method just described is applicable in particular to the real-time simulation of the dynamic behavior of a vehicle equipped with a chassis and with several tires rolling on the ground.

In an application such as this, each of the mechanical, local thermal and global thermal models, or at least the first one thereof, is used for each tire and is associated with a dynamic chassis model.

Each of the tire models cooperates with this chassis model, on the one hand in order to receive from the chassis model the values of the dynamic parameters, or at least some of them, and, on the other hand, in order to enable the chassis model to use the values for the longitudinal forces, lateral forces and self-aligning torque for each tire, which were obtained by implementing the tire models.

The invention claimed is:

1. A method of simulating the physical behavior of a tire equipping a vehicle rolling on the ground, wherein the tread of the tire has a contact area which includes an adherent contact area and a sliding contact area, wherein the method comprises:
   a computer exercising the steps of:
   calculating longitudinal forces and lateral forces transmitted by the tire, between the ground and the vehicle, based on dynamic parameters related to physical rolling comprising a slip angle and a longitudinal slip rate of the tire and operating conditions of the tire and based on specific physical parameters of the tire;
   establishing, over the course of a preliminary phase, by applying physical laws which are at least one of known and established by specific experiments, and as a first model, a model of the longitudinal forces, the lateral forces, a self-aligning torque related to the intensity of these forces and to the distribution of same within the contact area, and of an equilibrium of the basic shear and sliding forces of the tire at a presumed unique point of passage between the adherent and sliding contact regions, this first model forming a system of respective equations expressed in relation to the dynamic parameters, the specific parameters, and the abscissa of the point of passage;
   assigning values to the dynamic parameters and to the specific parameters, with a view to a digital application;
   solving, by successive approximations, over the course of a digital application iterative phase including a succession of computation cycles, and at least from previously known or estimated values of the abscissa of the point of passage, of the lateral forces, and of the self-aligning torque of new values for the abscissa of the point of passage, of the lateral forces, and of the self-aligning torque, which solve the system of equations of the first model for the values assigned to the dynamic parameters and to the specific parameters, the result of which is that the longitudinal forces, the lateral forces and the self-aligning torque can be computed in real time as the vehicle is traveling;
   taking account, in the first model established over the course of the preliminary phase, of an influence of temperature on the values of at least some of the specific parameters;
   establishing, over the course of this preliminary phase, by applying physical laws which are at least one of known and established by specific experiments, and as a second model, a local temperature rise model expressing variations in a contact temperature of the tire tread with the ground from a beginning to an end of the contact area, via contact of the tire tread with the ground and sliding of the tire over the ground;
   establishing, over the course of this preliminary phase, by applying physical laws which are at least one of known and established by specific experiments, and as a third model, a global temperature rise and thermal flux model, this third model forming a system of equations expressing variations in a peripheral tire tread temperature and an internal tire temperature, over one wheel revolution period, in relation to previously known or estimated values of the peripheral and internal temperatures, thermal conductivity of the tire tread, and thermodynamic component phenomena including one or more of internal deformations of the tire, heat exchanges between the tire and an environment thereof, and the sliding of the tire tread over the ground;
   accepting, as additional dynamic parameters, a temperature of the ground, air temperature of the tire, and an initial temperature of the tire;
   computing, at each computing cycle for each iterative phase, new values for the abscissa of the point of passage, for the lateral forces and for the self-aligning torque, by using the first model enhanced by the influence of temperature; and
   upon interruption of each iterative phase, updating the values for the peripheral and internal temperatures to take into account changes undergone by these temperatures since an end of a preceding iterative phase;
   wherein the longitudinal forces are obtained as a function of at least the slip angle and the longitudinal slip rate.

2. The simulation method of claim 1, further comprising an operation implemented after the end of the iterative phase and including updating at least the dynamic parameters, in order to take account of the changes undergone by these parameters during execution of the iterative phase, and to initiate a new iterative phase.

3. The simulation method of claim 2, wherein each new computing cycle for each iterative phase includes the steps of
   computing a new temporary value for the abscissa of the point of passage from the equilibrium of basic forces equations and from the previously known or estimated values for the lateral forces and the self-aligning torque;

computing, from the new temporary value of the abscissa of the point of passage and from the equations linking the lateral forces and the self-aligning torque to the dynamic parameters, to the specific parameters, and to the abscissa of the point of passage, new values for the lateral forces and the self-aligning torque, which can be used for a possible subsequent computing cycle;

conditionally interrupting said iterative phase, at least when the deviation between the new temporary value of the abscissa of the point of passage and the previously known or estimated value of this abscissa is lower than the predetermined accuracy limit; and upon interruption of said iterative phase, and as values for this phase, assigning, to the lateral forces and self-aligning torque, the new values for the lateral forces and the self-aligning torque, which were obtained during the last computing cycle.

4. The simulation method of claim 1, wherein the first model is enhanced by at least taking account of the influence of change in the contact temperature on the value of the friction coefficient of the tire rubber on the ground.

5. The simulation method of claim 4, wherein the first model is enhanced by taking account of the influence of the internal tire temperature on the value of the shear modulus of the rubber compound of the tire tread.

6. The simulation method of claim 1, wherein the second computing model uses the peripheral temperature of the tire to compute the contact temperature at the entry to the contact surface.

7. The simulation method of claim 1, wherein each iterative phase is preceded by a preparatory phase, over the course of which quota quantities are computed, including the dimensions of the contact area, by means of a sub-set of said equations and based on values assigned to the dynamic parameters and to the specific parameters, each quota quantity being used in said iterative phase with a value assigned thereto during the preparatory phase.

8. Application of the method of claim 1 to the real-time simulation of the dynamic behavior of a vehicle equipped with a chassis and with several tires rolling on the ground, an application in which at least the first model is used for each tire and is associated with a single dynamic chassis model, in which, for each tire, the chassis model provides at least said first model with the values of at least some of the dynamic parameters, and in which, for each tire, the chassis model uses the values for the longitudinal forces, the lateral forces and the self-aligning torque, which were obtained by implementing at least the first model.

* * * * *